Sept. 19, 1939.    A. N. SPÁNEL    2,173,343
FORM FOR MAKING DRESS SHIELDS AND THE LIKE
Filed Feb. 12, 1936    3 Sheets-Sheet 1
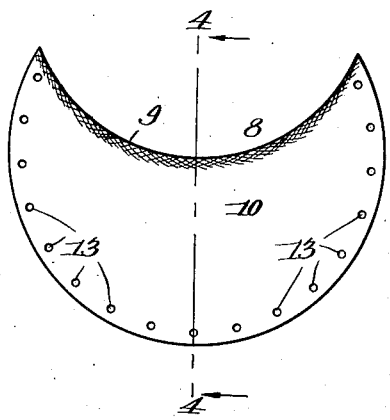
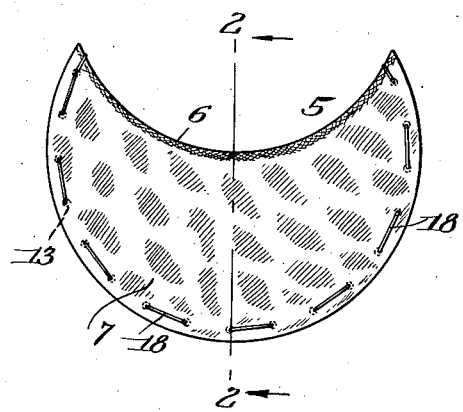
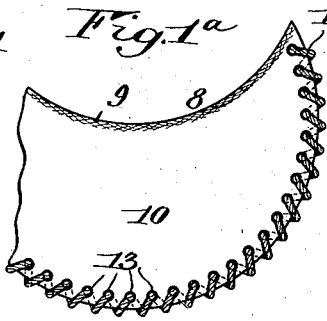
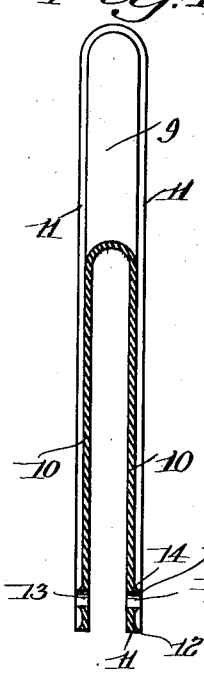
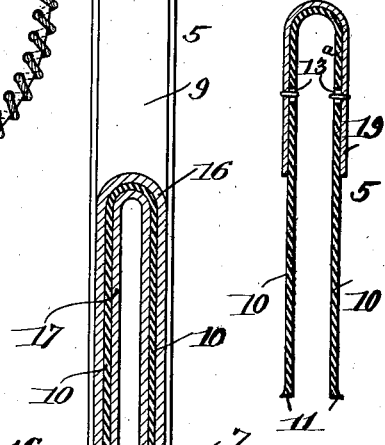
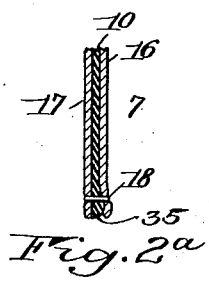
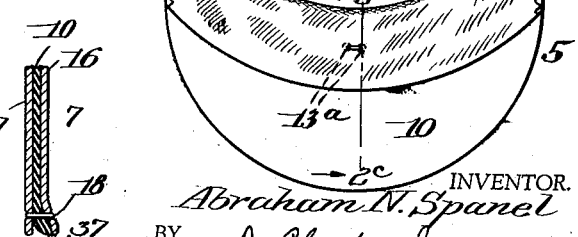
INVENTOR.
Abraham N. Spanel
BY D. Clyde Jones
his ATTORNEY.

Sept. 19, 1939. A. N. SPANEL 2,173,343
FORM FOR MAKING DRESS SHIELDS AND THE LIKE
Filed Feb. 12, 1936 3 Sheets-Sheet 2
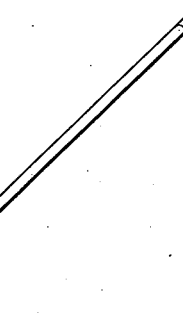
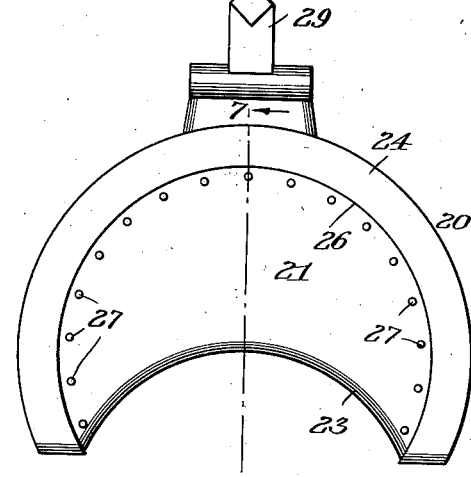
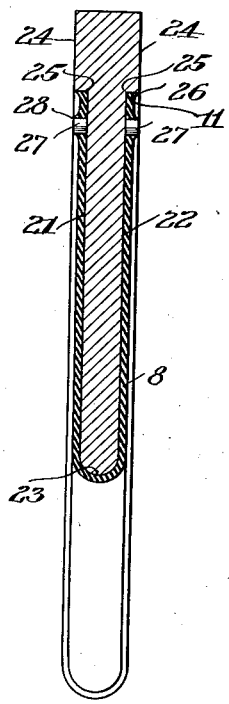
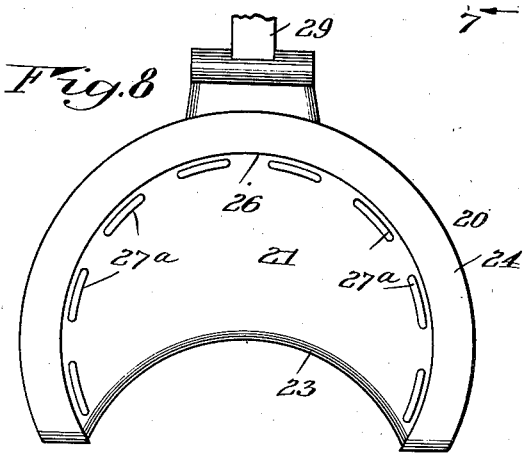
INVENTOR.
Abraham N. Spanel
BY D. Clyde Jones
his ATTORNEY.

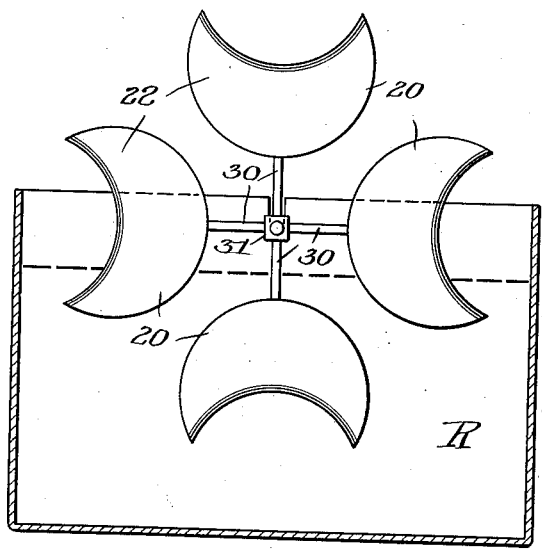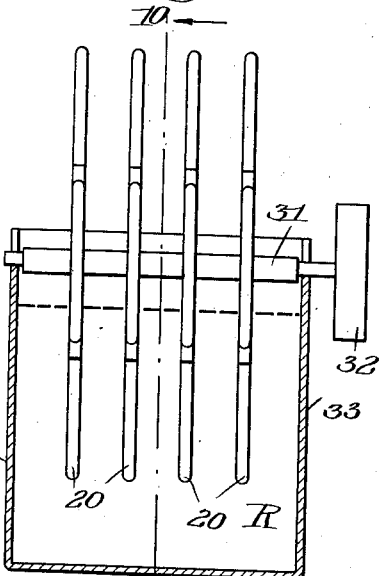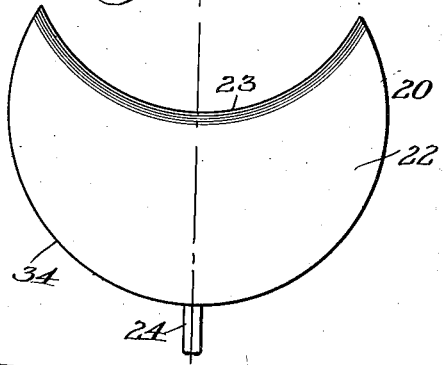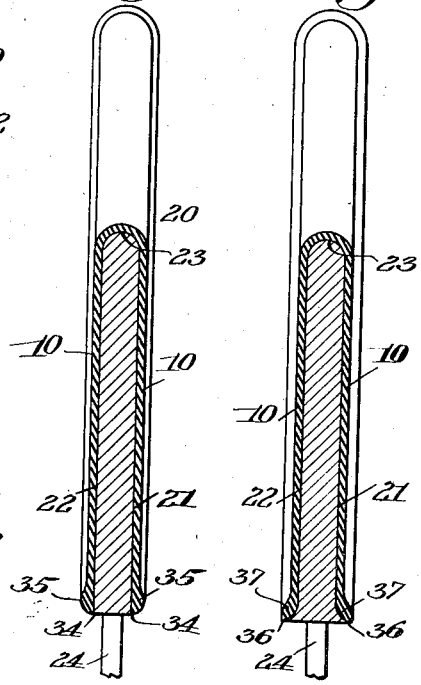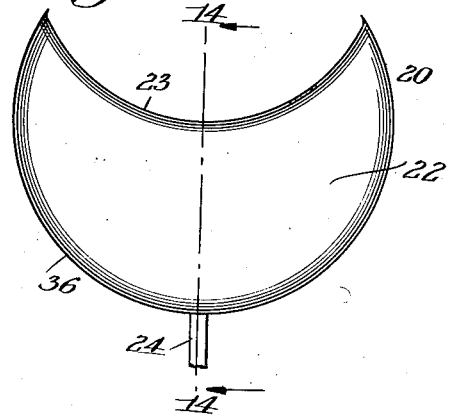

Patented Sept. 19, 1939

2,173,343

UNITED STATES PATENT OFFICE 2,173,343

FORM FOR MAKING DRESS SHIELDS AND THE LIKE

Abraham N. Spánel, Rochester, N. Y.

Application February 12, 1936, Serial No. 63,547

3 Claims. (Cl. 18—41)

This invention relates to dress shields and to the method of and to apparatus for making the same.

The main feature of the present invention relates to the provision of a dress shield which protects garments against perspiration, which is durable and which is inexpensive to manufacture.

Another feature of the invention relates to forms on which a latex foundation for such a shield can be deposited.

The various features and advantages of the invention will appear from the detailed description and claims when taken with the drawings, in which Fig. 1 is a front elevation of a complete dress shield; Fig. 1a is a fragmentary front view of a modified type of dress shield; Fig. 1c is a front view of a further modified type of dress shield; Fig. 2 is a vertical section through the shield of Fig. 1; Figs. 2a and 2b are sectional fragments of shields having foundations with modified types of reinforced edges taken substantially on the line 2—2 of Fig. 1; Figs. 2c is a vertical section of the shield of Fig. 1c, the section being taken on the line 2c—2c of that figure; Fig. 3 is a front elevation of the latex foundation of the shields of Figs. 1 and 1a; Fig. 4 is a vertical section through the foundation taken substantially on the line 4—4 of Fig. 3; Fig. 5 is a front elevation and Fig. 6 is a side elevation of a form on which the latex foundation can be deposited; Fig. 7 is a vertical section taken substantially on the line 7—7 of the form of Fig. 5; Fig. 8 is a front elevation of a slightly modified type of form; Fig. 9 is a longitudinal section through a receptacle containing a latex-depositing bath together with a plurality of forms that travel in a rotary path for successive dipping into the latex bath; Fig. 10 is a vertical section through the receptacle and the related forms, taken substantially on the line 10—10 of Fig. 9; Fig. 11 is a front elevation of a modified type of form on which a latex foundation having a marginal reinforcement of a different character from the reinforcement deposited on the form of Figs. 5 and 8, can be deposited; Fig. 12 is a vertical section of this form taken substantially on the line 12—12 of Fig. 11 and also illustrating a section of a latex shield foundation on the form; Fig. 13 is a front elevation of a form on which a foundation having a still different type of marginal reinforcement can be deposited; Fig. 14 is a vertical section of this form taken substantially on the line 14—14 of Fig. 13, which form has deposited thereon a latex shield having a different type of marginal reinforcement.

The shield 5, which is generally saddle-shaped, has the outline of a crescent, the upper edge 6 of the shield being concave to fit under the arm, and the flaps 7, 7 thereof being adapted to be fastened respectively in the sleeve and to the body of the garment at the sleeve opening. The shield includes a seamless latex foundation 8, preferably made by deposition from an aqueous dispersion of rubber. This foundation, which, is made in the general shape of the shield, is concave or inwardly curved at its upper part 9 to conform to the under part of the arm and is provided with side flaps 10, 10. The edges of the flaps 10, 10 are reinforced by an integral ridge or accumulation of latex 11. As best illustrated in Fig. 4, this reinforcement is generally triangular in shape and terminates in a feather edge 12, altho the reinforcement may be semi-pear-shaped in cross section as illustrated at 35 in Fig. 2a or may have the shape of a distorted ellipse as shown at 37 in Fig. 2b. The latex foundation adjacent the free edges of the side flaps is provided with a series of openings 13 by which a protective covering for the foundation can be sewed thereto without piercing the foundation. Each of the openings 13, which may be circular or elongated holes, is reinforced by an integral ridge 14 generally triangular in cross section and terminating in a feather edge 15, (Fig. 4). It will be understood that where the edges of the foundation are reinforced as illustrated at 35 and 37 in Figs. 2a and 2b they may or may not be provided with openings 13 as desired.

The inner and outer surfaces of the foundation are respectively covered with saddle-shaped pieces of fabric 16 and 17 of the general shape and outline of the foundation. These pieces of fabric when assembled on the inner and outer surfaces of the foundation in the relation shown in Fig. 2, are fastened to the free edges of the foundation flaps 10, 10 by stitches 18 which pass through the edges of the fabric pieces and through the reinforced holes 13 in the margin of the foundation. As illustrated in the fragmentary cross sectional views of Figs. 2a and 2b, the openings in the free margins of the flaps 10 have been omitted and the saddle-shaped pieces of the fabric 16 and 17 are attached to the free edges of the foundation, being stitched through the thickened reinforcements 35 and 37, or adjacent thereto.

In the modified type of shield shown in Fig. 1a, the outer and inner pieces of fabric 16 and 17 have been omitted so that in the finished shield a major portion of the latex foundation is exposed. However, in this type of shield, wicking 19 or other similar absorbent material is overcast about each free edge of the flap, being threaded through the series of openings 13 in the margin of each flap. Instead of over-casting the absorbent material on the margin of the flaps, it can be threaded through the openings 13 in various ways. It will be understood that in this type of shield, the margin of the latex at the openings 13 may or may not be reinforced as desired.

The further modified type of shield 5 illustrated in Figs. 1c and 2c, includes a crescent-shaped latex foundation having the connected side flaps 10. This foundation is partially covered by a strip of fabric 19 woven into saddle-shaped form so that its medial fold conforms to the curvature of the concave margin of the foundation. The fabric, woven in this shape, is preferably obtained in rolls and can be cut to the necessary lengths to fit the shields. The cut ends of each piece of strip, are preferably overcast to prevent raveling. The strip is then suitably fastened to foundation in the position indicated such as by stitching through the holes 13 and 13a in the foundation.

The latex foundation of Figs. 3 and 4, can be made on the forms illustrated in Figs. 5, 6 and 7. This form which can be made from aluminum, stainless steel or the like, comprises two crescent shaped panels 21 and 22 joined by an uninterrupted concave edge 23. This edge, as best shown in Fig. 7, is curved in cross section so that the panels merge into each other without any abrupt edge. The panels 21 and 22 are bounded by a raised continuous border 24 extending from one end of the curved edge 23 of the form proper, to the other end thereof. As also illustrated in Fig. 7, the junctions 25 of the border 24 with the panels 21 and 22, define recesses in which the reinforced edge 11 of the foundation can be deposited, while the border 24 is provided with an abrupt edge 26 adjacent each junction 25. Each of the panels 21 and 22 adjacent the junction 25 is provided with a series of generally circular bosses 27 projecting abruptly from the surface of the form. Each of these bosses has an abrupt edge 28, the purpose of which will further appear. The border 24 of the form is also provided with a bracket 29 to which there is secured a supporting arm 30 by which the form can be manipulated during the deposition of latex thereon.

The modified type of form illustrated in Fig. 8 differs from that already described in that the bosses 27a instead of being circular in cross section, are generally elongated. By this arrangement, the number of holes 13 in the foundation can be reduced.

In using the previously mentioned forms in the manufacture of latex foundations, a plurality of forms 20 are mounted, by means of arms 30, on a shaft 31 (Fig. 9) which is driven by the pulley 32 from any convenient source of power. As illustrated in Fig. 10, four of these forms are mounted as a group in a common plane and a series of such groups of forms are secured in spaced relation along the shaft 31. The shaft 31 is mounted in suitable bearings in the end walls 33 of a receptacle R containing an aqueous dispersion of rubber, commonly known as latex, of a depth indicated by the broken line. With the forms mounted in the relation shown in Figs. 9 and 10, the shaft 31 is rotated to dip the forms 20 successively into the latex bath. The shaft 31 is rotated at such a speed that the latex deposited on the forms will develop as few "runs" as possible during the dipping operation. The forms are thus rotated in this manner until a layer of latex of the desired thickness is deposited thereon. Then the shaft 31 with the latex coated forms thereon is removed from the receptacle and the latex coatings on the forms are permitted to "set".

It will be understood that the latex will tend to flow away from the abrupt edges of the form, consequently, there will be a line of weakness developed at the abrupt edges 26 of the border and the abrupt edges 28 of the bosses 27. When the latex is properly "set" on the forms, the excess latex on the border is torn or stripped away as far as the line of weakness therein developed by the abrupt edge 26. The latex layer on the ends of the bosses 27 is also stripped away. When the latex layer on the panels 21 and 22 is removed therefrom, a finished latex foundation will result.

As illustrated in Figs. 11 and 12, the form 20 may be modified by omitting the raised border 24. Instead, the panels 21 and 22 terminate in abrupt edges 34 in the surface of the panels. This last mentioned form develops a foundation, similar to that already described except that the free margins thereof are reinforced by ridges 35 which are generally semi-pear-shaped in cross section. The depositing of the latex foundation on this type of form is similar to that already described, except that the latex during the dipping operation accumulates above the abrupt edge 34 as a ridge, illustrated at 35, while at the abrupt edge 34, a line of weakness is developed in the latex layer so that the excess portion of the latex on the area of the form between the abrupt edges 34, can be stripped away.

The form 20 illustrated in Fig. 13 and 14 differs from the form just described in that the panels 21 and 22 flare outwardly to the projecting edges 36 of the form. With this construction of the form, the reinforcement 37 at the free margin of the foundation will have a cross section as illustrated in Fig. 14. This type of reinforcement, as well as that shown in Fig. 12, has the advantage that it possesses sufficient body for stitching the fabric covering thereto so that openings need not be preformed in the margin of the foundation. The several operations involved in depositing a foundation on this form need not be set forth since they are identical with those already described.

The present disclosure is given merely by way of example and it will be understood that there can be many modifications and variations therein within the scope of the appended claims without departing from the spirit of the present invention.

What I claim is:

1. A form for making a deposited latex article provided with an integral reinforced margin, said form having the general shape of the desired article and being provided with a surface flaring outwardly to an abrupt edge.

2. A form for making dress shields, having an article-generating surface including two opposed substantially crescent-shaped portions gradually merging into each other at their concave margins and a portion outside of said article-generating surface, edge reinforcement-generating means on said form defining substantial portions of the convex margins of said crescent-shaped portions, and means for supporting said form while rubber or the like is being deposited thereon, said lastnamed means being secured to said outside portion of said form.

3. A form for making dress shields, having an article-generating surface including two opposed substantially crescent-shaped portions curving into each other at their concave margins, edge reinforcement-generating means on said form defining substantial portions of the convex margins of said crescent-shaped portions, and means for supporting said form while a layer of rubber or the like is being deposited thereon.

ABRAHAM N. SPÁNEL.